United States Patent [19]
Curry

[11] Patent Number: 5,671,440
[45] Date of Patent: Sep. 23, 1997

[54] COLOR IMAGE DATA REORIENTATION AND FORMAT CONVERSION SYSTEM

[75] Inventor: Kenneth D. Curry, Victor, N.Y.

[73] Assignee: Eastman Kodak Company, Rochester, N.Y.

[21] Appl. No.: 287,373

[22] Filed: Aug. 8, 1994

[51] Int. Cl.$^6$ .............................. G06F 3/12; G06K 15/02
[52] U.S. Cl. .......................... 395/828; 395/109; 395/137; 395/138
[58] Field of Search .................... 395/109, 112, 395/115, 118, 131, 137, 138, 828

[56] References Cited

U.S. PATENT DOCUMENTS

| | | |
|---|---|---|
| 3,976,982 | 8/1976 | Eiselen . |
| 4,168,488 | 9/1979 | Evans . |
| 4,267,573 | 5/1981 | Chaikin et al. . |
| 4,271,476 | 6/1981 | Lotspiech . |
| 4,344,146 | 8/1982 | Davis, Jr. et al. . |
| 4,611,232 | 9/1986 | Searby . |
| 4,627,020 | 12/1986 | Anderson et al. . |
| 4,636,783 | 1/1987 | Omachi . |
| 4,712,185 | 12/1987 | Aoki . |
| 4,806,920 | 2/1989 | Sawada . |
| 4,837,845 | 6/1989 | Pruett et al. . |
| 4,850,028 | 7/1989 | Kawamura et al. . |
| 5,012,434 | 4/1991 | Zietlow et al. . |
| 5,050,225 | 9/1991 | Itoh . |
| 5,063,526 | 11/1991 | Kagawa et al. . |
| 5,067,167 | 11/1991 | Berger . |
| 5,081,700 | 1/1992 | Crozier . |
| 5,111,192 | 5/1992 | Kadakia . |
| 5,124,692 | 6/1992 | Sasson . |
| 5,199,101 | 3/1993 | Cusick et al. . |
| 5,237,646 | 8/1993 | Bunce . |
| 5,241,626 | 8/1993 | Taoda . |

OTHER PUBLICATIONS

"TMC2301—CMOS Image Resampling Sequencer", TRW LSI Products, Inc., La Jolla, CA, 1990, pp. 21–39.

*Primary Examiner*—Jack B. Harvey
*Assistant Examiner*—Jigar Pancholi
*Attorney, Agent, or Firm*—Milton S. Sales

[57] ABSTRACT

A raster imaging device with the capability of computing a storage or retrieval address of color components (channels) of each pixel "on-the-fly" as the data is stored into a color image memory or retrieved from the memory, respectively. This computation of the address allows simultaneous image data format conversion and image reorientation.

20 Claims, 7 Drawing Sheets

| R00 | G00 | B00 | R01 | G01 | B01 | R02 | G02 | B02 |
|---|---|---|---|---|---|---|---|---|
| R10 | G10 | B10 | R11 | G11 | B11 | R12 | G12 | B12 |

| R00 | R01 | R02 | G00 | G01 | G02 | B00 | B01 | B02 |
|---|---|---|---|---|---|---|---|---|
| R10 | R11 | R12 | G10 | G11 | G12 | B10 | B11 | B12 |

| R00 | R01 | R02 | R10 | R11 | R12 |
|---|---|---|---|---|---|
| G00 | G01 | G02 | G10 | G11 | G12 |
| B00 | B01 | B02 | B10 | B11 | B12 |

COLOR IMAGE DATA REORIENTATION AND FORMAT CONVERSION SYSTEM

BACKGROUND OF THE INVENTION

1. Field of the Invention

The present invention is directed to a system for color image reorientation and format conversion during raster image processing which allows data from various types of input devices to be oriented and formatted for various types of output devices and, more particularly, to a system that generates, "on-the-fly", the address to which a pixel is written or from which it is fetched for image reorientation and conversion during image reproduction operations.

2. Description of the Related Art

Various raster image scanner, display device and printer technologies impose differing data format constraints known by those skilled in the art. For example, there are currently three types of data interleaved formats: pixel, line and channel, sometimes called field or plane. The pixel format is used by a first type of device, typified by three color printers, single point drum scanners, light valve technology film writers and CRT displays, the line format is used typically for resistive multi-head thermal printers, film readers, compact disk scanners and film scanners and the channel format is used by a third type of device, such as a single head resistive thermal printer or CRT printer with a color filter wheel. To allow a color image to be used with any of these devices the image must be capable of being input or output in color pixel, line or channel sequential input/output (I/O) formats.

Digital color images are stored in a variety of the formats to complement the output device for which they are intended. For example, images stored in the TIFF format typically are in the pixel or channel sequential image data format.

Printing devices are also being called upon to print an image in the proper orientation for the particular media type and media size. For example, some thermal printers print on what is considered the back side of the media and, thus, the image needs to be reversed or flipped, while photographic print type printers print on the front of the media. The output media size and aspect ratio can also vary, for example landscape versus portrait and wide angle versus normal angle. These various types of output media require that the image be properly oriented prior to printing.

Conventional printers will only print in the format and orientation and on a media for which they are designed. If an image is in an incorrect format, orientation or for a different media, the image will not be correctly reproduced.

What is needed is a printer that will accept an image in any format, in any orientation and for any media and convert the image for the format, orientation and media of that printer.

SUMMARY OF THE INVENTION

It is an object of the present invention to provide a printer that will convert between color pixel, line and plane sequential interleaved formats, so that the printer can print an image received in any format.

It is another object of the present invention to provide a printer that will flip and rotate an image into the proper orientation for the media of the printer.

It is an object of the present invention to perform format and orientation conversions "on-the-fly" as the color image data is moving from the source to the print head.

It is also an object of the present invention to decouple color image input data format requirements from output data formats.

It is an object of the present invention to provide a printer with end of line and end of channel padding capability, so that images of a size different than the page size can be rendered.

It is a still further object of the present invention to provide support for raster images having a variable number of color channels and variable pixel bit widths.

The above objects can be accomplished by a raster imaging device with the capability of changing a storage or retrieval address of color components of each pixel as the data is stored into a color image memory or retrieved from the memory. The changing of the address allows the format of the color image data to be changed as well as reoriented. The raster imaging device also includes capabilities that automatically add pad data to the end of image lines and at the end of channels where necessary. When the format of the data transfers are in groups of higher bit numbers (32 bits versus 8 bits) the system includes block transfer capability that enhances performance.

These, together with other objects and advantages which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Digital color image data stored in a random access memory device can be read out of the memory device in a programmable fashion to effectively reorient the image (i.e. rotate, flip up/down, flip left/right). Conversely, the same method can be employed to reorient the image as it is written into the random access memory device. This rotation is required both on output from a pixel, line, or channel-oriented image capture device and on input to a pixel, line, or channel-oriented image display device or printer, when image reorientation is desired (eg. landscape versus portrait printer options).

If one considers a typical CRT display device as a reference, the color data appearing on the CRT device is displayed in lines from left-to-right (line scan direction), with subsequent lines displayed top-to-bottom (page scan direction). The method of image reorientation disclosed herein facilitates eight discrete image reorientations. The reorientation is accomplished via programmable address generation during data transfer in software or hardware.

If one considers typical output devices whether they be a CRT device or a thermal printer device the ordering of the color components (channels) of each pixel and the ordering of pixels changes. The method of image data format conversion disclosed herein facilitates conversion between the different device formats.

The appropriate values for the programmable reorientation and reformatting of the present invention are derived from the location of the image in memory, the image data format in the memory, the desired output image data format, and, the desired output image orientation.

The "on-the-fly" method of the present invention can be accomplished in real-time during data transfer to or from the memory. The method works on n-dimensional (multichannel) images. It serves to decouple input data format requirements from output data format requirements for various technologies, in addition to reorientation, thereby accomplishing two objectives with a single address generation scheme. Additionally, the method of the present invention provides images with end-of-line or end-of-channel padding by providing modifications to the address calculations. The method also includes imaging application transfers where pixels are wider than 8-bit bytes which is accomplished with appropriate shifts in address calculations.

Figure 1A:
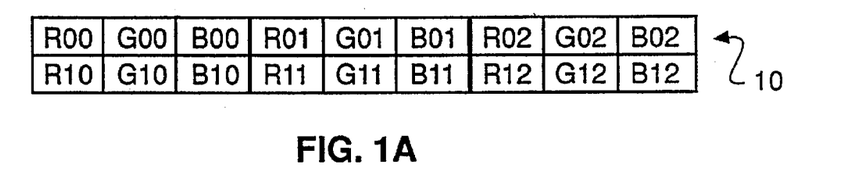
FIGS. 1A–1C illustrate different raster image data formats.
Figure 1B:
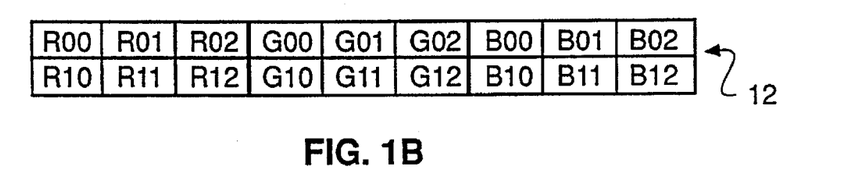
Figure 1C:
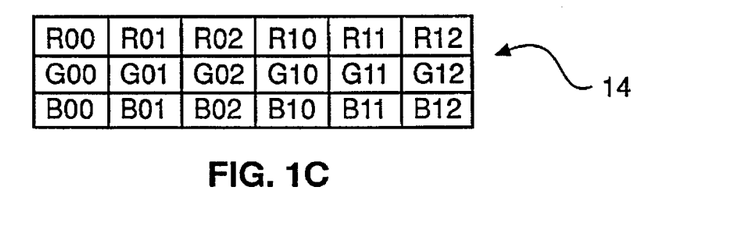

Digital color image data is stored, generated and printed in several different sequential input/output (I/O) formats as illustrated in FIGS. 1A-1C, using two dimensional array indexing. The present invention decouples the input and output formats from each other, as mentioned above, by allowing a printer to receive data in one format and print it in another format, particularly the format for which the printer was designed. FIGS. 1A-1C depict a hypothetical image that includes two lines, three pixels per line and three channels (for example, RGB -red, green, blue). These figures also depict how the hypothetical image is represented in the three formats: pixel, line and channel. The color pixel sequential format 10 of FIG. 1A arranges the color components (channels) of each pixel in a group and interleaves the pixels. The color line sequential format 12 of FIG. 1B arranges all the same color components for a first line together followed by the next color until the line is complete and so on for each subsequent line. The color channel sequential format 14, as shown in FIG. 1C, groups all of the first color component (channel) data together followed by the next color and so on. The present invention allows an input source to supply pixels in any of these I/O formats and convert the data to any of the other I/O formats for printing. The I/O format of the output of the conversion is preferably the format of the printer in which the conversion is performed, which in the case of the preferred embodiment is color pixel sequential format. It should be noted that the data could be sent to other devices instead of being printed. As can be seen by comparing FIGS. 1A-1C the color components (channels) of each pixel must be located in a different order and the pixels themselves are in a different order, that is a definite relationship exists between pixel component locations in each format. Other orders are possible as well as a different number of channels.

Figure 2:
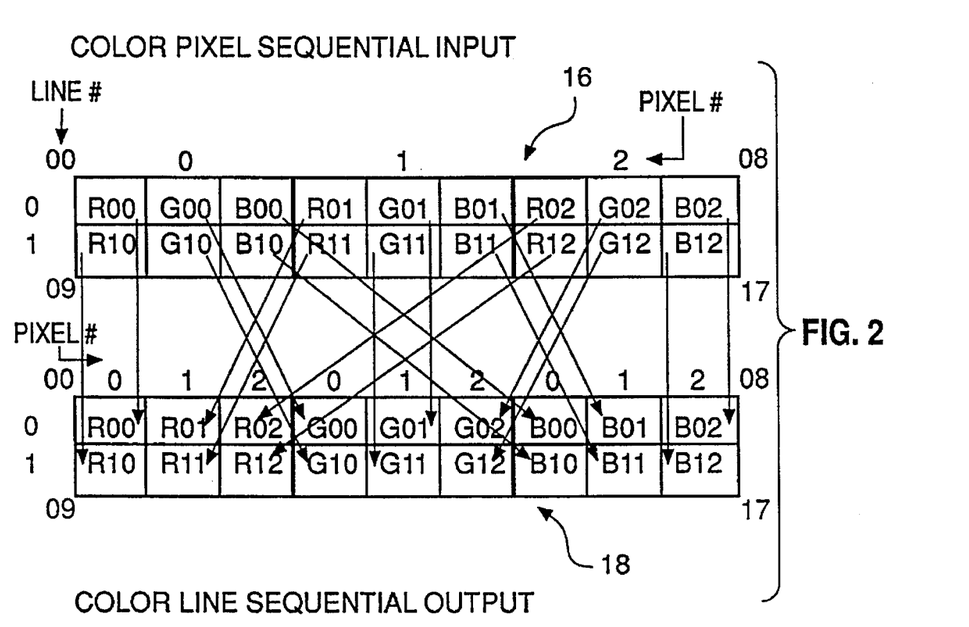
FIG. 2 illustrates a raster image data format conversion from pixel to line.

The transformation from a pixel sequential format to a line sequential format is illustrated in FIG. 2. As can be seen by the arrows indicating the movement of pixels from one location to another, a regular relationship between the source pixel location and the destination pixel location exists. This relationship, as will be discussed in more detail later, is used to determine a source address when the format transformation is performed during the output operation or a destination address when the transformation is performed during the input operation. The present invention preferably performs the transformation during input. Assuming that the movement is from a location in a source 16 to a location in a destination 18 of a random access memory, the blue (B) pixel component of pixel 0 of line 0 at 8-bit memory location 02 in the source 16 is moved to memory location 06 in the destination 18. During an input operation the blue component of the first pixel in the sequential input stream, that is the third input value, is stored in memory location 06.

Figure 3A:
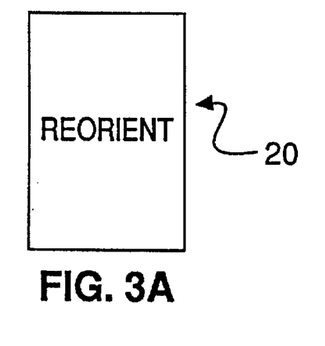
FIGS. 3A–3H illustrate different image orientations.
Figure 3B:
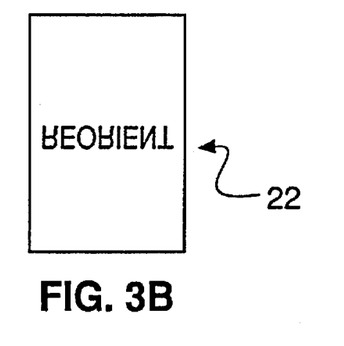
Figure 3C:
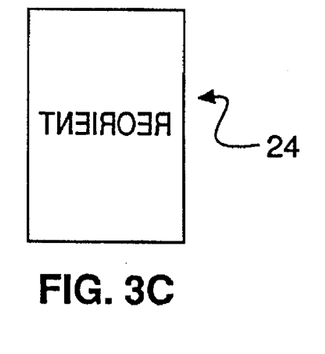
Figure 3D:
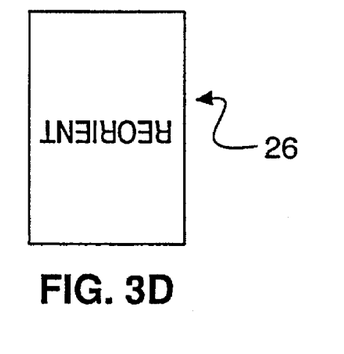
Figure 3E:
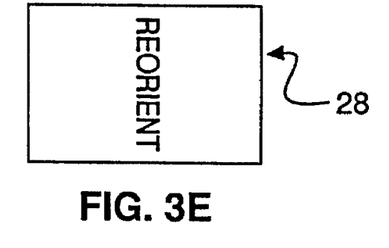
Figure 3F:
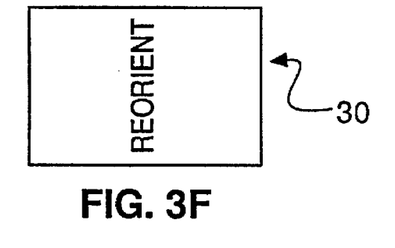
Figure 3G:
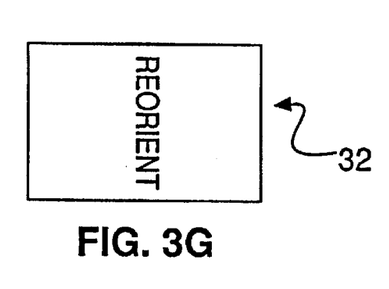
Figure 3H:
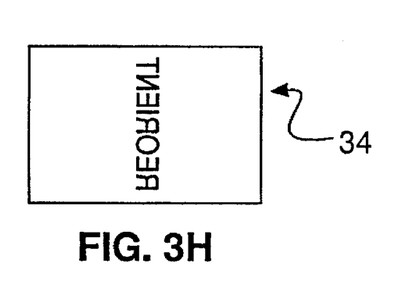

The present invention also orients (flips and rotates) the image data to accommodate different media type and media size. The different 90 degree increment orientations are shown in FIGS. 3A-3H where FIG. 3A illustrates a reference orientation left-to-right and top-to-bottom (LRTB) image 20. Left-to-right is typically the fast scan direction or line direction and top-to-bottom is the slow scan or page direction. With reference to the reference orientation of FIG. 3A, FIG. 3B illustrates a simple vertical flip resulting in a left to right and bottom to top (LRBT) image 22. FIG. 3C illustrates a horizontal flip resulting in an RLTB image 24. FIG. 3D illustrates flips both horizontally and vertically resulting in an RLBT image 26 which also produces an image rotated 180 degrees. FIGS. 3F and 3G illustrate rotations of 90 degrees counter clockwise (TBRL-30) and clockwise (BTLR-32), respectively, and FIGS. 3E and 3H illustrate a combination of a flip with a 90 degree clockwise rotation resulting in a TBLR image 28 and BTRL image 34, respectively.

Figure 4:
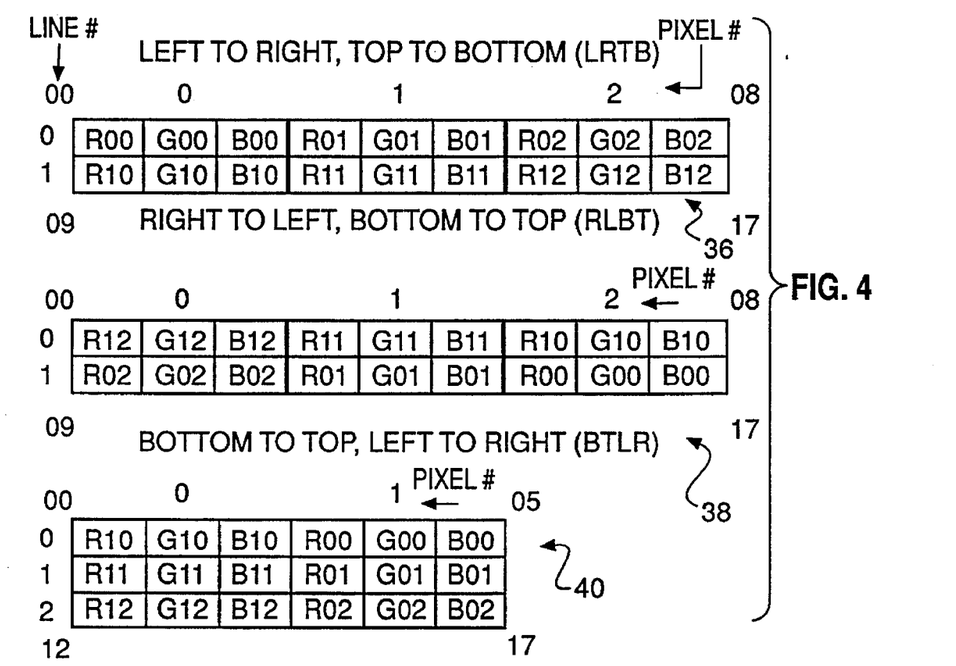
FIG. 4 illustrates conversion from left-to-right and top-to-bottom image orientation to right-to-left and bottom-to-top orientation as well as to bottom-to-top and left-to-right orientation.

A reorientation from LRTB to RLBT and from LRTB to BTLR, which corresponds to transforming from FIG. 3A to FIG. 3D or from FIG. 3A to FIG. 3G, is depicted in FIG. 4. Once again regular relationships exist for these transformations and these relationships are used to control source or destination addresses when the output or input operations, respectively, are performed. In the conversion from LRTB to RLBT the pixel (B00) at memory location 02 in the source 36 is moved to location 17 in the destination 38. During a sequential input the third input value is stored in location 17. In the conversion from LRTB to BTLR the pixel at location 02 in the source 36 is moved to location 05 in the destination 40. During a sequential input the third input value is stored in location 05.

Figure 5:
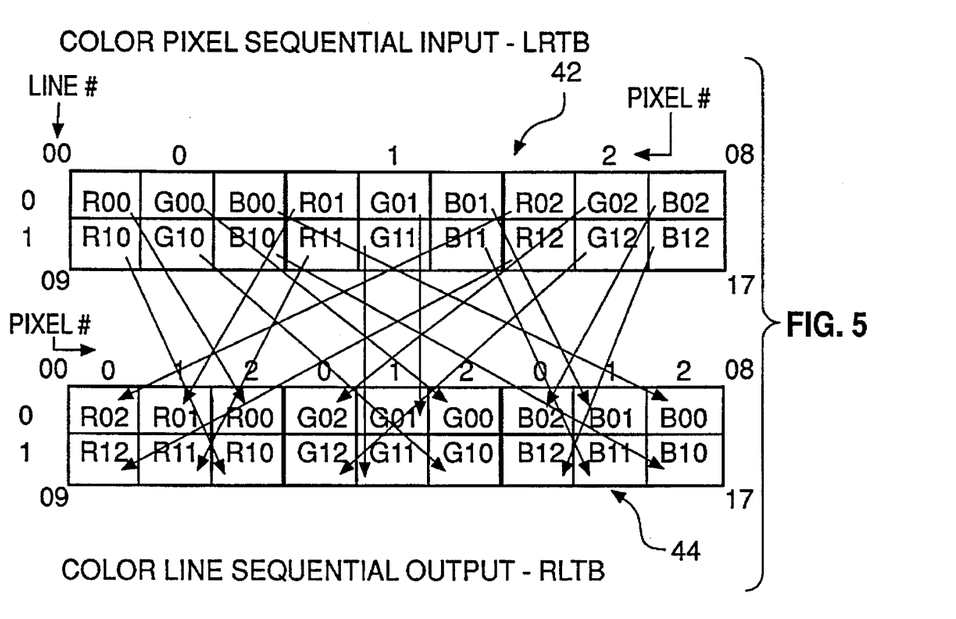
FIG. 5 illustrates a combination of a format conversion with a reorientation.

The present invention performs both image data format conversion and image orientation operations simultaneously by combining the regular relationships mentioned above into a single address computation. A conversion from pixel-to-line format and a reorientation from LRTB to RLTB is illustrated in FIG. 5. Once again the arrows indicate the movement of the pixel color components from source 42 to destination 44 locations. The pixel of the previous examples at source 42 location 02 moves to location 08 in the destination 44 map. If the conversion is performed during an input operation the third input value is stored at location 08. If the conversion operation is performed during output the eighth output value is obtained from location 02.

Figure 6:
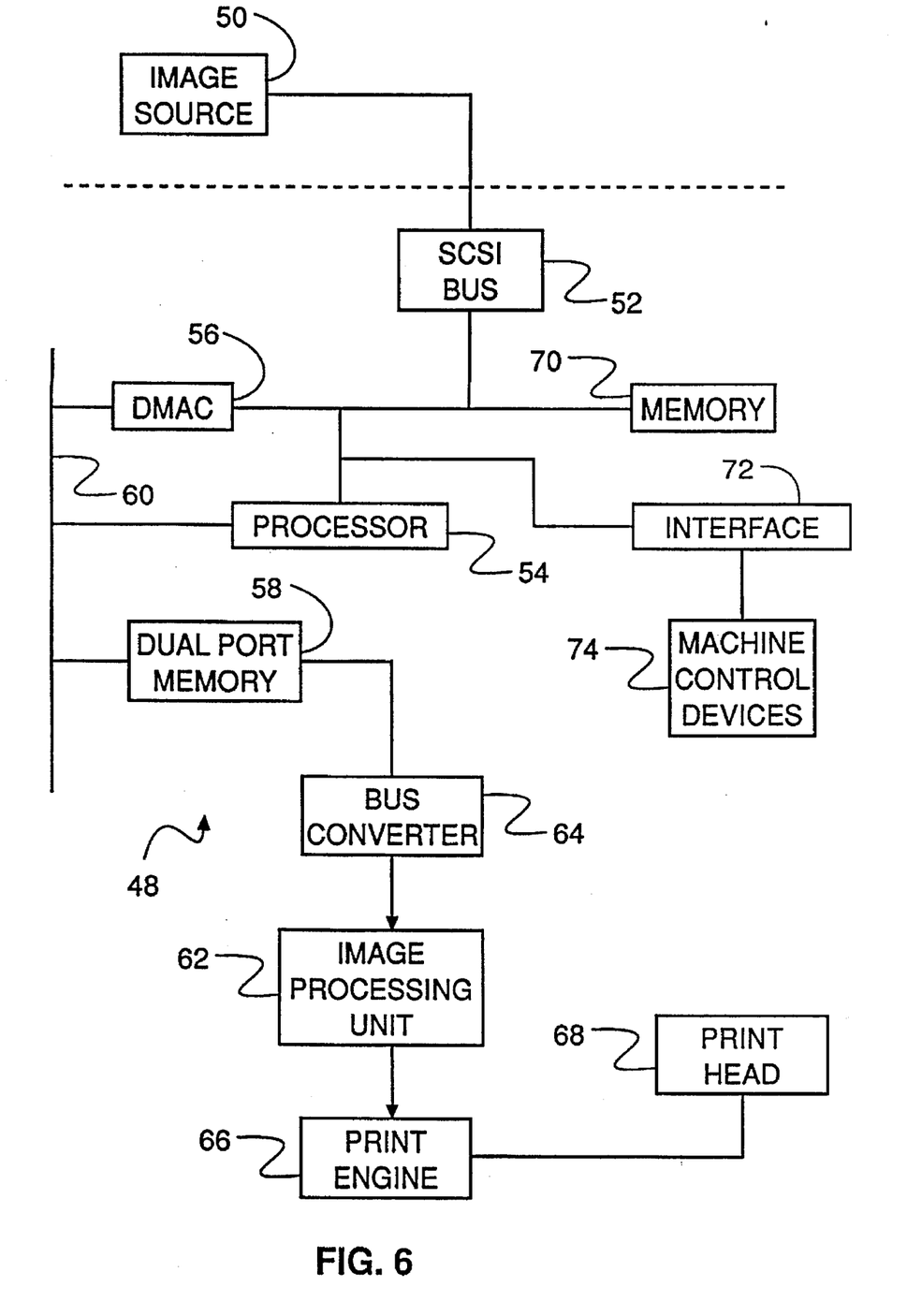
FIG. 6 illustrates the hardware of the preferred embodiment.

The present invention can be implemented in a transformation control device which can be a computer or a programmable address generator. However, the above discussed simultaneous conversion and orientation operations are preferably performed in a raster image printer 48 with the components illustrated in FIG. 6. An image source 50, such as a host computer, provides image source data in one of the formats, in one of the orientations previously discussed and in 8-bit bytes with one of the three colors of a pixel per byte. The source data arrives at a conventional small computer system interface (SCSI) bus 52 where, under the control of a conventional processor 54, such as the 68LC040 from Motorola, which controls the operation of a direct memory access control unit (DMAC) 56, the incoming data is transferred to a conventional dual port memory 58, such as is available from Micro Memories, over a conventional VME bus 60. The processor 54, preferably controls the write address of the memory 58 as the data is received over the bus 52, as previously discussed, to perform the appropriate reorientation and reformatting. Alternately, the reformatting and reorientation can be performed when the data is retrieved from memory 58 and supplied to an image processing unit 62 by a bus converter 64 which converts the data between bus formats. The image processing unit 62 can perform conventional image processing operations, such as image sharpening and resizing. The data from the unit 62 is used by a conventional print engine 66 to drive a conventional color print head 68. The printer 48 also includes a conventional memory 70, which stores the program which performs the address computations for reformatting and reorientation, as well as includes an interface 72 through which machine control devices 74 such as motors, sensors and solenoids of the printer 48 are controlled.

Figure 7:
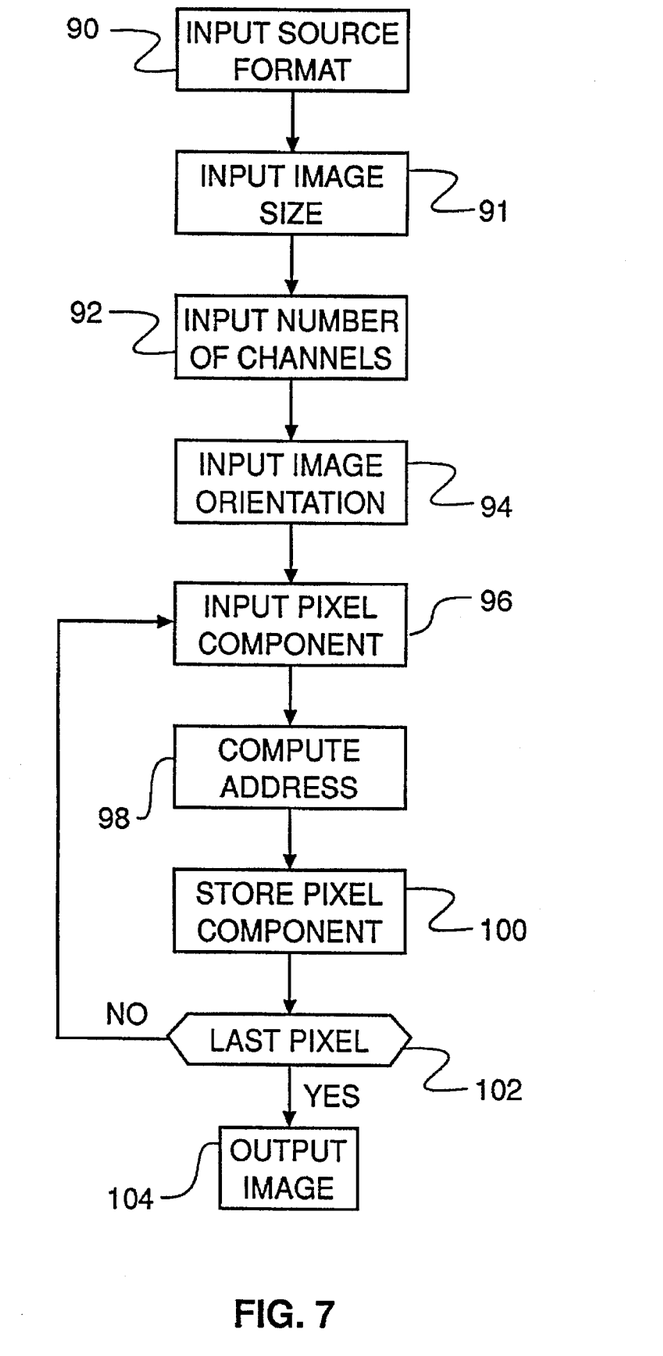
FIG. 7 is a flowchart of the operations performed by the processor of FIG. 6.

As discussed above, in the preferred embodiment of FIG. 6 the conversion operation is performed by processor 54 during the input operation by calculating a write address for each pixel component. As illustrated in FIG. 7, the conversion process performed by the processor 54 starts by inputting 90 the source format (pixel, line or channel), inputting 91 the image size (pixels per line and lines per image), inputting 92 the number of channels (where RGB has 3 channels, CMYK has 4, etc.), and inputting 94 the destination orientation. Note that the order of steps 90–94 is not important as long as they precede the next step. Once the input necessary to define the source data is received the system enters a computation loop where pixels are input 96 and the destination address in memory 58 for the reformatted and reoriented pixel component is computed 98.

The pixel component address is computed, depending on the device format in accordance with the "reader and writer procedure" set forth later herein. The parameters of the address computations illustrated in the procedure are controlled in accordance with the values set forth later herein in Table 1—Reader and Table 1—Writer, where P is pixels per line, L is lines per image, C is number of color channels, PO is the address offset of subsequent pixels and LO is the address offset of subsequent lines. The parameters $c[1]$, $c[2]$, $c[3]$ and $c[C]$ are the address offsets to the first pixel of each color channel. For CMYK pixels the number of channels is four. $c[1]$ indicates the offset for the cyan pixel component, $c[2]$ the magenta component, $c[3]$ the yellow component and $c[4]$ the K (black) component while $c[1]$, $c[2]$ and $c[3]$ are the offsets for an RGB pixel, respectively. These values are retrieved from storage iteratively during the channel count loop. For an image with 4 pixels per line, 6 lines per image and 3 color channels, for color line sequential input being converted to color pixel sequential output and a reorientation from LRTB to LRBT the reader parameter values are: P=4, L=6, C=3, PO=3, LO=−12, $c[1]$=60, $c[2]$=61 and $c[3]$=62. For the same format change but reorientation from LRTB to TBRL the parameter values are: PO=12, LO=−3, $c[1]$=9, $c[2]$=10 and $c[3]$=11.

A performance improvement based on eliminating redundant computations is also outlined in the appendix entitled "Improved Reader and Writer Procedure". Temporary variables are introduced to hold invariants of the address calculation. This technique is well understood by those skilled in the art. For example, in the case of a READER, for color pixel sequential output, the total number of multiplications and additions are reduced from $2*C*P*L$ and $4*C*P*L$, respectively in the original procedure, to $L*(1+P)$ and $L*(1+2*P+C*P)$, respectively in the improved procedure.

The common address computation function illustrated later herein, which includes nested loops, produces the combined effect of data format conversion and image reorientation in a simple and cost effective manner which allows the procedure to be implemented as a very small program or in a small amount of firmware or in relatively simple hardware. The process provides flexibility in satisfying numerous applications where the image size, number of channels, pixel bit width, etc. can vary.

Once the address is determined 98 (FIG. 7) each of the pixels is stored 100 in the memory 58 at the address computed. When a determination 102 indicates that the last pixel component has been stored, the image is conventionally output 104 through print engine 66 to the printer head 68 while the printer motors etc. are controlled in an appropriate manner.

Figure 8:
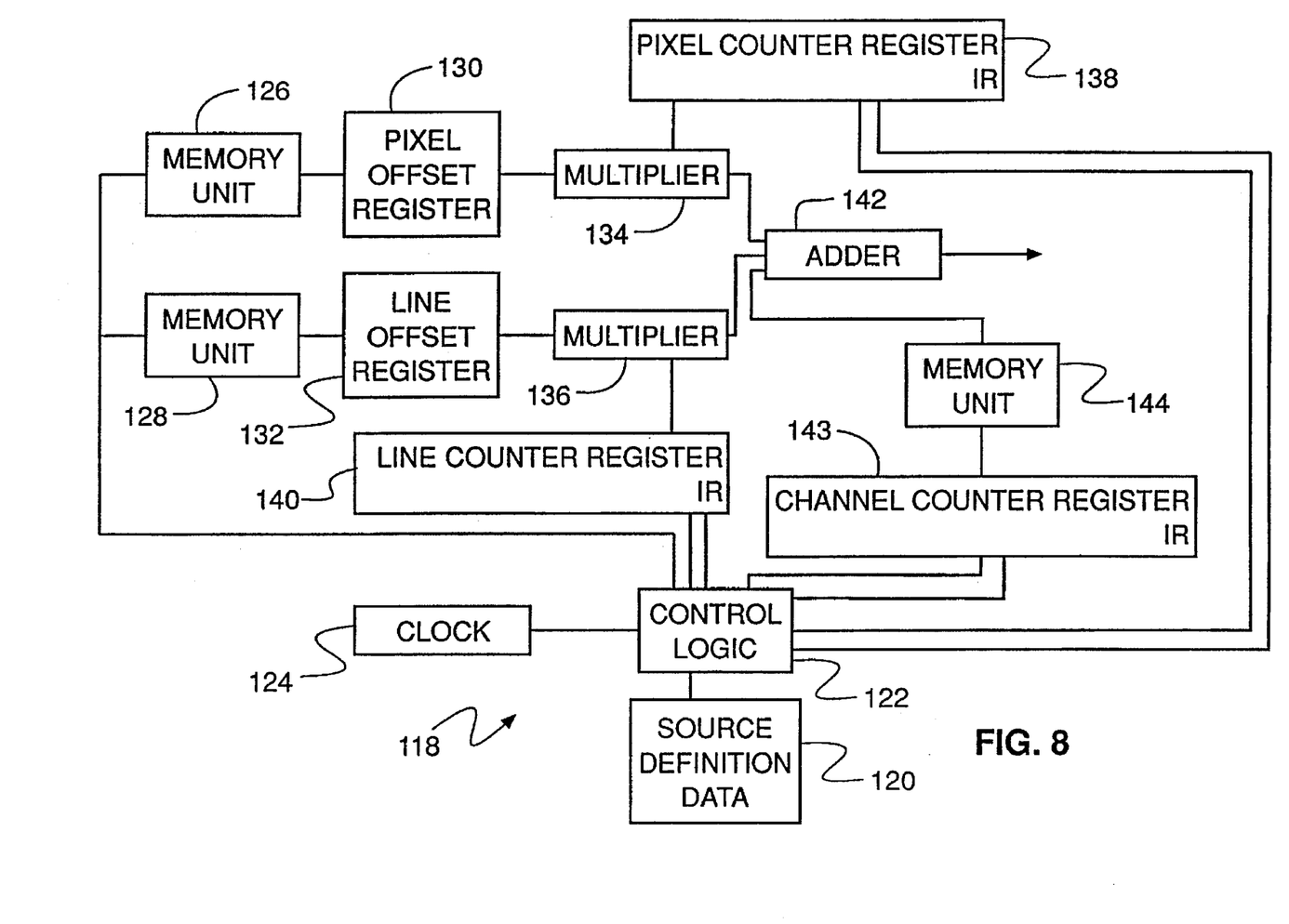
FIG. 8 is a hardware embodiment for performing programmable address computation.

The address computation operations set forth above can be performed using hardware components of a programmable address generator 118 as illustrated in FIG. 8. The source definition data 120 which defines the format, size and orientation of the source image is input to a control logic unit 122 which, based on a pixel clock 124, controls the remaining components to perform the calculations previously mentioned. Memory units 126 and 128 or groups of storage registers output the control parameters for pixel and line offsets as set forth in Table 1—Reader and Table 1—Writer. The outputs are stored in corresponding output registers 130 and 132. Multipliers 134 and 136 multiply the offsets by the pixel and line counts from corresponding registers 138 and 140 performing the line and pixel multiplications of the computation. The count value in the registers 138 and 140 is controlled by the logic unit 122 through the increment (I) and reset (R) inputs. An adder 142 adds the channel offset from memory 144 controlled by the channel counter 143 to produce the destination address which is supplied to the destination memory.

As noted previously the address computation is performed based on a transfer of eight bits per pixel component or channel. To improve the performance on the input (WRITER) side, an intermediate input buffer (not shown) can be provided for the processor 54. The buffer is a size that is a multiple of the line length of the input image. When this buffer is full, 32-bit or block moves can be performed across bus 60 to memory 58, rather than 8-bit bus transfers. This increased performance can be attained in some of the circumstances set forth in Table 2 later herein. For example, when the input stream is eight bits per byte color pixel sequential, the output is color line sequential and the orientation stays LRTB. Block moves can be performed for an interleaved line after a line is constructed. For the same example except LRTB changes to RLBT block moves can be performed after a reversed interleaved line is constructed. The block moves improve transfer performance speed. Table 2 also indicates when a portion of the memory can be reused. That is, the memory associated with line can be reused after the contents of the line are moved out.

Performance can also be improved on the output (READER) side. If an intermediate buffer of thirty-two bits is interposed between the memory 58 and the converter 64 of FIG. 6 block move transfers of thirty-two bits can be performed from memory 58 to converter 64 in certain circumstances. This will increase the performance of the printer on the output side and result in faster printing of the image when the reformatting and reorientation is performed.

Figure 9:
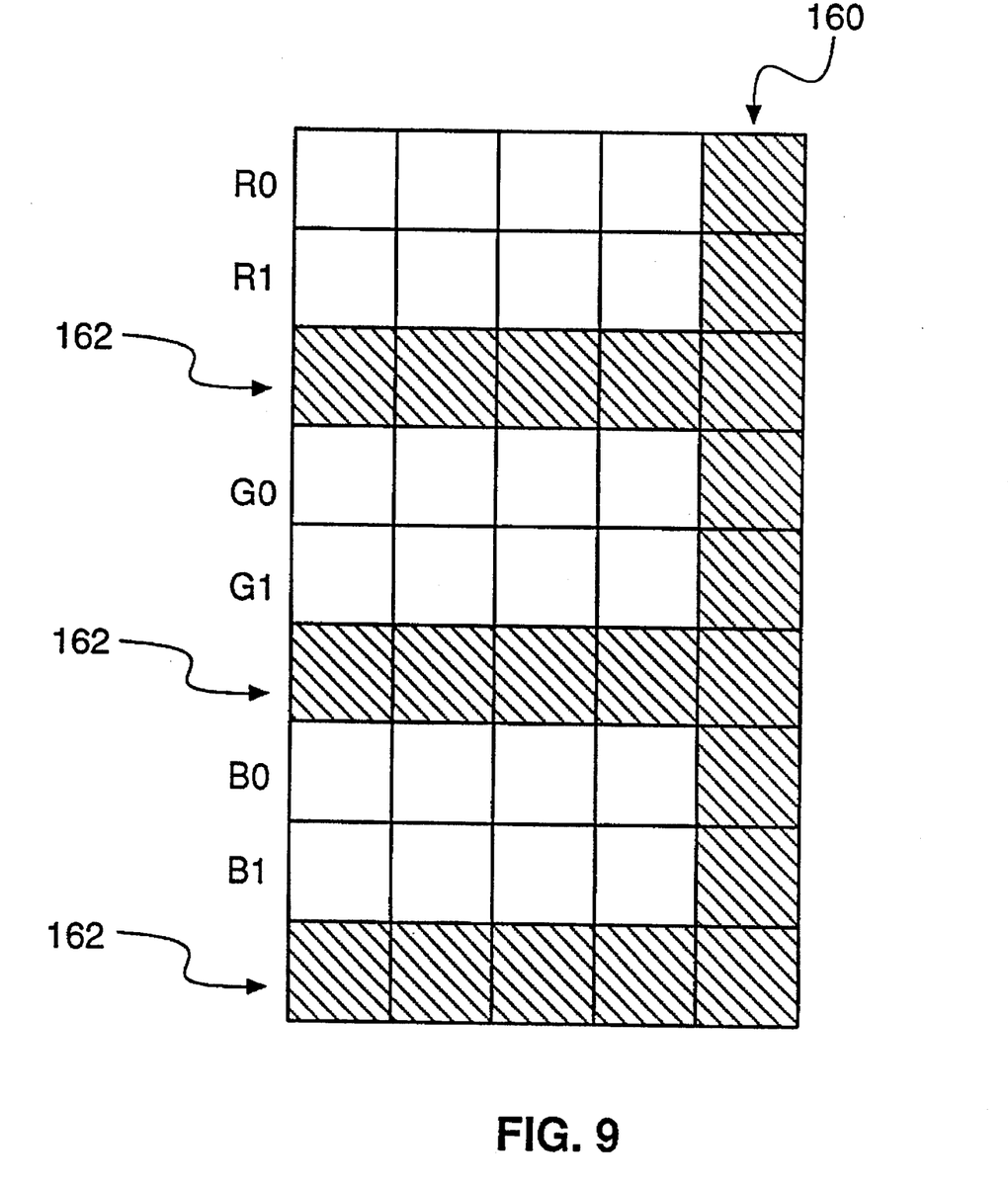
FIG. 9 depicts padding of lines and channels.

The present invention can also perform the end of line padding and end-of-channel padding necessary when the page size is larger than the image size. The end-of-line padding 160 fills the end of each line with conventional pad characters and the end-of-channel padding 162 fills the lines with conventional pad characters. This padding can be accomplished by filling the memory 58 with pad characters before the input operation of FIG. 7 is performed. Alternatively, separate registers of the maximum line length expected and of a number for the maximum number of channels expected can be provided. These registers can be reset to contain pad characters prior to each transfer. Another and preferred alternative is to provide two additional offsets in the pixel location calculations.

Although the present invention has been described with respect to performing format conversion and image reorientation in a raster image processor printer the transformation can be performed separate from any I/O device as well as in other I/O devices, such as a color image scanner.

Certain image storage formats (computer video memory) include four channels where the fourth channel is a graphics overlay that can be provided on top of an image. In such a situation, an additional offset can be added so that this channel can be ignored.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

READER AND WRITER PROCEDURE

| | Multiplications | Additions |
|---|---|---|
| For a READER (applications where on-the-fly image data format conversion and reorientation is performed while reading out of RAM), | | |
| 1. algorithm to execute is based on the OUTPUT image data format being produced. | | |
| 2. Parameter (register) values are based on the INPUT image data format | | |
| 3. Pixels per line & lines per image based on the OUTPUT image data format | | |
| For Color Pixel Sequential Output: | | |
| FOR line #1 to Output Lines Per Image | | |
| FOR pixel #1 to Output Pixels Per Line | | |
| FOR channel #1 to C | | |
| Fetch address = c[channel] + PO*(pixel-1) + LO*(line-1) | 2*C*P*L | 4*C*P*L |
| For Color Line Sequential Output | | |
| FOR channel #1 to C | | |
| FOR line #1 to Output Lines Per Image | | |
| FOR pixel #1 to Output Pixels Per Line | | |
| Fetch address = c[channel] + PO*(pixel-1) + LO*(line-1) | 2*C*P*L | 4*C*P*L |
| For Color Plane Sequential Output: | | |
| FOR channel #1 to C | | |
| FOR line #1 to Output Lines Per Image | | |
| FOR pixel #1 to Output Pixels Per Line | | |
| Fetch address = c[channel] + PO*(pixel-1) + LO*(line-1) | 2*C*P*L | 4*C*P*L |
| For a WRITER (applications where on-the-fly image data format conversion and reorientation is performed while writing into RAM), | | |
| 1. algorithm to execute is based on the INPUT image data format being consumed | | |
| 2. Parameter (register) values are based on the OUTPUT image data format | | |
| 3. Pixels per line & lines per image are based on the INPUT image data format | | |
| For Color Pixel Sequential Input: | | |
| FOR line #1 to Input Lines Per Image | | |
| FOR pixel #1 to Input Pixels Per Line | | |
| FOR channel #1 to C | | |
| Write address = c[channel] + PO*(pixel-1) + LO*(line-1) | 2*C*P*L | 4*C*P*L |
| For Color Line Sequential Input: | | |
| FOR channel #1 to C | | |
| FOR line #1 to Input Lines Per Image | | |
| FOR pixel #1 to Input Pixels Per Line | | |
| Write address = c[channel] + PO*(pixel-1) + LO*(line-1) | 2*C*P*L | 4*C*P*L |
| For Color Plane Sequential Input: | | |
| FOR channel #1 to C | | |
| FOR line #1 to Input Lines Per Image | | |
| FOR pixel #1 to Input Pixels Per Line | | |
| Write address = c[channel] + PO*(pixel-1) + LO*(line-1) | 2*C*P*L | 4*C*P*L |

-continued

IMPROVED READER AND WRITER PROCEDURE

| | Multiplications | Additions |
|---|---|---|
| READER - performance improvement using temporary variable for invariants; eliminate redundant computations | | |
| For Color Pixel Sequential Output: | | |
| For line #1 to Output Lines Per Image | | |
| Let lineOffset + LO*(line-1) | L | L |
| FOR pixel #1 to Output Pixels Per Line | | |
| Let lineAndPixelOffset = lineOffset + PO*(pixel-1) | P*L | 2*P*L |
| FOR channel #1 to C | | |
| Fetch address = c[channel] + lineAndPixelOffset | | C*P*L |
| For Color Line Sequential Output | TOTAL L*(1+P) | L*(1+2*P+C*P) |
| FOR line #1 to Output Lines Per Image | | |
| Let lineOffset + LO*(line-1) | L | L |
| FOR channel #1 to C | | |
| Let lineAndChannelOffset = lineOffset +c[channel] | | C*L |
| FOR pixel #1 to Output Pixels Per Line | | |
| Fetch address = PO*(pixel-1) + lineAndChannelOffset | P*C*L | 2*P*C*L |
| For Color Plane Sequential Output: | TOTAL L+P*C*L | L*(1+C+2*P*C) |
| FOR channel #1 to C | | |
| Let channelOffset = c[channel] | | |
| FOR line #1 to Output Lines Per Image | | |
| Let channelAndLineOffset = channelOffset + LO*(line-1) | L*C | 2*L*C |
| FOR pixel #1 to Output Pixels Per Line | | |
| Fetch address = PO*(pixel-1) + channelAndLineOffset | P*L*C | 2*P*L*C |
| | TOTAL L*C*(1+P) | L*C*(2+2*P) |
| WRITER - performance improvement using temporary variables for invariants; eliminates redundant computations | | |
| For Color Pixel Sequential Input: | | |
| For line #1 to Input Lines Per Image | | |
| Let lineOffset + LO*(line-1) | L | L |
| FOR pixel #1 to Input Pixels Per Line | | |
| Let lineAndPixelOffset = lineOffset + PO*(pixel-1) | P*L | 2*P*L |
| FOR channel #1 to C | | |
| Write address = c[channel] + lineAndPixelOffset | | C*P*L |
| For Color Line Sequential Input: | TOTAL L*(1+P) | L*(1+2*P+C*P) |
| FOR line #1 to Input Lines Per Image | | |
| Let lineOffset + LO*(line-1) | L | L |
| FOR channel #1 to C | | |
| Let lineAndChannelOffset = lineOffset + c[channel] | | C*L |
| FOR pixel #1 to Input Pixels Per Line | | |
| Write address = PO*(pixel-1) + lineAndChannelOffset | P*C*L | 2*P*C*L |
| For Color Plane Sequential Input: | TOTAL L+P*C*L | L*(1+C+2*P*C) |
| FOR channel #1 to C | | |
| Let channelOffset = c[channel] | | |
| FOR line #1 to Input Lines Per Image | | |
| Let channelAndLineOffset = channelOffset + LO*(line-1) | L*C | 2*L*C |
| FOR pixel #1 to Input Pixels Per Line | | |
| Write address = PO*(pixel-1) + channelAndLineOffset | P*L*C | 2*P*L*C |
| | TOTAL L*C*(1+P) | L*C*(2+2*P) |

-continued

"Table 1 - Reader"
On-the-fly Image Data Format Conversion & Reorientation Using Programmable Address Generation
READER parameter (register) values
Let P = input pixels per image line   Let L = input lines per image   Let C = # of color channels

| Output Orientation | LRTB | LRBT | RLTB | RLBT | TBLR | TBRL | BTLR | BTRL |
|---|---|---|---|---|---|---|---|---|
| For Color Pixel Sequential Input: | | | | | | | | |
| PO = Pixel Offset | C | C | −C | −C | P*C | P*C | −P*C | −P*C |
| LO = Line Offset | P*C | −P*C | P*C | −P*C | C | −C | C | −C |
| c[1] = start address of channel 1 | 0 | P*(L−1)*C | C*(P−1) | (P*L*C)−C | 0 | C*(P−1) | P*(L−1)*C | P*(L−1)*C+(P−1) |
| c[2] = start address of channel 2 | c[1]+1 | c[1]+1 | c[1]+1 | c[1]+1 | c[1]+1 | c[1]+1 | c[1]+1 | c[1]+1 |
| c[3] = start address of channel 3 | c[2]+1 | c[2]+1 | c[2]+1 | c[2]+1 | c[2]+1 | c[2]+1 | c[2]+1 | c[2]+1 |
| c[C] = start address of channel C | c[C−1]+1 | c[C−1]+1 | c[C−1]+1 | c[C−1]+1 | c[C−1]+1 | c[C−1]+1 | c[C−1]+1 | c[C−1]+1 |
| Output Pixels Per Line | P | P | P | P | L | L | L | L |
| Output Lines Per Image | L | L | L | L | P | P | P | P |
| For Color Line Sequential Input: | | | | | | | | |
| PO = Pixel Offset | 1 | 1 | −1 | −1 | P*C | P*C | −P*C | −P*C |
| LO = Line Offset | P*C | −P*C | P*C | −P*C | −1 | 1 | −1 | 1 |
| c[1] = start address of channel 1 | 0 | P*(L−1)*C | P−1 | P*(L−1)*C+(P−1) | 0 | C*(P−1) | P*(L−1)*C | P*(L−1)*C+(P−1) |
| c[2] = start address of channel 2 | c[1]+P | c[1]+P | c[1]+P | c[1]+P | c[1]+P | c[1]+P | c[1]+P | c[1]+P |
| c[3] = start address of channel 3 | c[2]+P | c[2]+P | c[2]+P | c[2]+P | c[2]+P | c[2]+P | c[2]+P | c[2]+P |
| c[C] = start address of channel C | c[C−1]+P | c[C−1]+P | c[C−1]+P | c[C−1]+P | c[C−1]+P | c[C−1]+P | c[C−1]+P | c[C−1]+P |
| Output Pixels Per Line | P | P | P | P | L | L | L | L |
| Output Lines Per Image | L | L | L | L | P | P | P | P |
| For Color Plane Sequential Input: | | | | | | | | |
| PO = Pixel Offset | 1 | 1 | −1 | −1 | P | P | −P | −P |
| LO = Line Offset | P | −P | P | −P | 1 | −1 | 1 | −1 |
| c[1] = start address of channel 1 | 0 | P*(L−1) | (P−1) | (P*L)−1 | 0 | (P−1) | P*(L−1) | (P*L)−1 |
| c[2] = start address of channel 2 | c[1]+(P*L) | c[1]+(P*L) | c[1]+(P*L) | c[1]+(P*L) | c[1]+(P*L) | c[1]+(P*L) | c[1]+(P*L) | c[1]+(P*L) |
| c[3] = start address of channel 3 | c[2]+(P*L) | c[2]+(P*L) | c[2]+(P*L) | c[2]+(P*L) | c[2]+(P*L) | c[2]+(P*L) | c[2]+(P*L) | c[2]+(P*L) |
| c[C] = start address of channel C | c[C−1]+(P*L) | c[C−1]+(P*L) | c[C−1]+(P*L) | c[C−1]+(P*L) | c[C−1]+(P*L) | c[C−1]+(P*L) | c[C−1]+(P*L) | c[C−1]+(P*L) |
| Output Pixels Per Line | P | P | P | P | L | L | L | L |
| Output Lines Per Image | L | L | L | L | P | P | P | P |

"Table 1 - Writer"
On-the-fly Image Data Format Conversion & Reorientation Using Programmable Address Generation
WRITER parameter (register) values
Let P = input pixels per image line   Let L = input lines per image   Let C = # of color channels

| Output Orientation | LRTB | LRBT | RLTB | RLBT | TBLR | TBRL | BTLR | BTRL |
|---|---|---|---|---|---|---|---|---|
| For Color Pixel Sequential Output | | | | | | | | |
| PO = Pixel Offset | C | C | −C | −C | L*C | L*C | −L*C | −L*C |
| LO = Line Offset | P*C | −P*C | P*C | −P*C | C | −C | C | −C |
| c[1] = start address of channel 1 | 0 | P*(L−1)*C | C*(P−1) | (P*L*C)−C | 0 | L*(P−1)*C | C*(L−1) | (P*L*C)−C |
| c[2] = start address of channel 2 | c[1]+1 | c[1]+1 | c[1]+1 | c[1]+1 | c[1]+1 | c[1]+1 | c[1]+1 | c[1]+1 |
| c[3] = start address of channel 3 | c[2]+1 | c[2]+1 | c[2]+1 | c[2]+1 | c[2]+1 | c[2]+1 | c[2]+1 | c[2]+1 |
| c[C] = start address of channel C | c[C−1]+1 | c[C−1]+1 | c[C−1]+1 | c[C−1]+1 | c[C−1]+1 | c[C−1]+1 | c[C−1]+1 | c[C−1]+1 |

-continued

| | | | | | | | | |
|---|---|---|---|---|---|---|---|---|
| Input Pixels Per Line | P | P | P | P | P | P | P | P |
| Input Lines Per Image | L | L | L | L | L | L | L | L |
| For Color Line Sequential Output: | | | | | | | | |
| PO = Pixel Offset | 1 | 1 | -1 | -1 | $L*C$ | $L*C$ | $-L*C$ | $-L*C$ |
| LO = Line Offset | $P*C$ | $-P*C$ | $P*C$ | $-P*C$ | 1 | 1 | -1 | -1 |
| c[1] = start address of channel 1 | 0 | $P*(L-1)*C$ | $P*(L-1)*C$ | $P*(L-1)*C+(P-1)$ | 0 | $L*(P-1)*C$ | $L*(P-1)*C$ | $L*(P-1)*C+(L-1)$ |
| c[2] = start address of channel 2 | c[1]+P | c[1]+P | c[1]+P | c[1]+P | c[1]+L | c[1]+L | c[1]+L | c[1]+L |
| c[3] = start address of channel 3 | c[2]+P | c[2]+P | c[2]+P | c[2]+P | c[2]+L | c[2]+L | c[2]+L | c[2]+L |
| c[C] = start address of channel C | c[C-1]+P | c[C-1]+P | c[C-1]+P | c[C-1]+P | c[C-1]+L | c[C-1]+L | c[C-1]+L | c[C-1]+L |
| Input Pixels Per Line | P | P | P | P | P | P | P | P |
| Input Lines Per Image | L | L | L | L | L | L | L | L |
| For Color Plane Sequential Output: | | | | | | | | |
| PO = Pixel Offset | 1 | 1 | -1 | -1 | L | L | -L | -L |
| LO = Line Offset | P | $-P$ | P | $-P$ | 1 | 1 | -1 | -1 |
| c[1] = start address of channel 1 | 0 | $P*(L-1)$ | $(P-1)$ | $(P*L)-1$ | 0 | $L*(P-1)$ | $(L-1)$ | $(P*L)-1$ |
| c[2] = start address of channel 2 | c[1]+(P*L) | c[1]+(P*L) | c[1]+(P*L) | c[1]+(P*L) | c[1]+(P*L) | c[1]+(P*L) | c[1]+(P*L) | c[1]+(P*L) |
| c[3] = start address of channel 3 | c[2]+(P*L) | c[2]+(P*L) | c[2]+(P*L) | c[2]+(P*L) | c[2]+(P*L) | c[2]+(P*L) | c[2]+(P*L) | c[2]+(P*L) |
| c[C] = start address of channel C | c[C-1]+(P*L) | c[C-1]+(P*L) | c[C-1]+(P*L) | c[C-1]+(P*L) | c[C-1]+(P*L) | c[C-1]+(P*L) | c[C-1]+(P*L) | c[C-1]+(P*L) |
| Input Pixels Per Line | P | P | P | P | P | P | P | P |
| Input Lines Per Image | L | L | L | L | L | L | L | L |

TABLE 2

WRITER
Table of Schemes for Increased Performance Using Intermediate Buffering to Use 32-bit vs. 8-bit Bus Transfers

| Image Data Format Input | Image Data Format Output | LRTB | LRBT | RLTB | RLBT | TBLR | TBRL | BTLR | BTRL |
|---|---|---|---|---|---|---|---|---|---|
| Color Pixel Sequential | Color Pixel Sequential | a | b | c | c | d | d | d | d |
| Color Pixel Sequential | Color Line Sequential | e | e | f | f | g | g | g | g |
| Color Pixel Sequential | Color Plane Sequential | h | i | j | j | g | g | g | g |
| Color Line Sequential | Color Pixel Sequential | k | m | n | n | d | d | d | d |
| Color Line Sequential | Color Line Sequential | a | b | c | c | g | g | g | g |
| Color Line Sequential | Color Plane Sequential | p | i | j | j | g | g | g | g |
| Color Plane Sequential | Color Pixel Sequential | g | g | g | g | g | g | g | g |
| Color Plane Sequential | Color Line Sequential | b | b | c | c | g | g | g | g |
| Color Plane Sequential | Color Plane Sequential | a | b | c | c | d | d | d | d | a = block move
b = block move per line
c = block move per line after line reversal
d = 3-32 bit xfers per line (4 line input)
e = block move after line interleave
f = block move after line reversed interleave
g = 3-32 bit noncontiguous xfers per line (4 lines input)
h = block move after plane interleave
i = block move per line after plane interleave
j = block move per line after line reversed plane interleave
k = block move after pixel inteleave
m = block move per line after pixel interleave
n = block move per line after line reversed pixel interleave
p = block move per plane

REFERENCE NUMBER LIST

10 Pixel image
12 Line image
14 Channel image
16,36,42 Source
18,38,40,44 Destination
20 LRTB image
22 LRBT image
24 RLTB image
26 RLBT image
28 TBLR image
30 TBRL image
32 BTLR image
34 BTRL image
50 Image source
52 SCSI bus
54 Processor
56 DMAC
58 Dual port memory
60 VME bus
62 Image processing unit
64 BUS converter
66 Print engine
68 Print head
70 Memory
72 Interface
74 Machine control devices
90–104 Flowchart steps
120 Source Definition data
122 Control logic unit
124 Clock
126,128,144 Memory unit
130,132,138,140,143 Register
134,136 Multiplier
142 Adder
160 Line padding
162 Channel padding

What is claimed is:

1. A color image data transformation system, comprising:
   a data buffer receiving input color image data in a data interleaved format and in an orientation of a first type;
   a memory storing the data in a format and an orientation of a second type; and
   a transformation control device, coupled to said buffer and said memory, transferring the data between said buffer and said memory and changing the data interleaved format and the orientation between the first and second types.

2. A system as recited in claim 1, wherein the transformation control device comprises a computer which calculates one of a storage and fetch address.

3. A system as recited in claim 1, wherein said transformation control device comprises a programmable address generator.

4. A system as recited in claim 1, further comprising a multiple byte buffer coupled to said memory and receiving block transfers of multiple bytes from said memory.

5. A system as recited in claim 1, wherein said transformation control device changes the format and orientation simultaneously.

6. A color image data transformation system, comprising:
   a data buffer receiving input color image data in a format and in an orientation of a first type;
   a memory storing the data in a format and an orientation of a second type; and
   a transformation control device, coupled to said buffer and said memory, transferring the data between said buffer and said memory and changing the format and the orientation between the first and second types, said transformation control device comprising a computer which calculates one of a storage and a fetch address where the address is:

$$\text{Address} = CO + PO*(\text{pixel}-1) + LO*(\text{line}-1)$$

where CO is a channel offset, PO is a pixel offset, LO is a line offset, pixel is a current pixel count and line is a current line count.

7. A color image data transformation system, comprising:
a data buffer receiving input color image data in a format and in an orientation of a first type;
a memory storing the data in a format and an orientation of a second type; and
a transformation control device, coupled to said buffer and said memory, transferring the data between said buffer and said memory, changing the format and the orientation between the first and second types and comprising a computer which calculates one of a storage and fetch address with said address being modified by a line pad offset and a channel pad offset.

8. A color image data transformation system, comprising:
a data buffer receiving input color image data in a format and in an orientation of a first type;
a memory storing the data in a format and an orientation of a second type; and
a transformation control device, coupled to said buffer and said memory, transferring the data between said buffer and said memory and changing the format and the orientation between the first and second types with the format comprising one of color pixel sequential, color line sequential and color channel sequential and the orientation comprising one of LRTB, LRBT, RLTB, RLBT, TBLR, TBRL, BTLR and BTRL where L is left, R is right, T is top and B is bottom and the orientations are increments of 90 degrees.

9. A color image data printing system, comprising:
an input data buffer connected to an image source and receiving input color image data one color image component at a time in a first sequential format and in a first image orientation;
a memory storing the image data in a second sequential format and a second image orientation;
a computer, connected to said buffer and said memory, transferring the data one component at a time between said buffer and said memory and simultaneously changing from the first sequential format to the second sequential format and from the first image orientation to the second orientation by computing a storage address where Address=CO+PO*(pixel−1)+LO*(line−1)

where CO is a channel offset, PO is a pixel offset, LO is a line offset, pixel is a current pixel count and line is a current line count and the component is stored at the address in said memory; and
means, coupled to said memory, for printing the image.

10. A method of color image data transformation, comprising:
a. inputting pixels of an image having a data interleaved format and an orientation of a first type;
b. determining addresses for the pixels which produces an image in which the data interleaved format and the orientation are of a second type; and
c. storing the pixels at the addresses.

11. A method as recited in claim 10, wherein the determining of the addresses simultaneously changes the format and orientation.

12. A method of color image data transformation, comprising:
a. inputting pixels of an image having a format and an orientation of a first type;
b. determining addresses for the pixels which produces an image in which the format and the orientation are of a second type; and
c. storing the pixels at the addresses where each of the addresses is determined as Address=CO+PO*(pixel−1)+LO*(line−1)

where CO is a channel offset, PO is a pixel offset, LO is a line offset, pixel is a current pixel count and line is a current line count.

13. A color image data transformation system, comprising:
a memory storing the data in a data interleaved format and an orientation of a first type; and
a transformation control device, coupled to said memory, transferring the data between said memory and a printer and changing the data interleaved format and the orientation of the data between the first type and a second type.

14. A system as recited in claim 11, wherein the transformation control device comprises a computer which calculates one of a storage and fetch address.

15. A system as recited in claim 11, wherein said transformation control device comprises a programmable address generator.

16. A system as recited in claim 13, further comprising a multiple byte buffer coupled to said memory and receiving block transfers of multiple bytes from said memory.

17. A system as recited in claim 13, wherein said transformation control device changes the format and orientation simultaneously.

18. A color image data transformation system, comprising:
a memory storing the data in a format and an orientation of a first type; and
a transformation control device, coupled to said memory, transferring the data between said memory and a printer and changing the format and the orientation of the data between the first type and a second type, said transformation control device comprises a computer which calculates one of a storage and fetch address where the address is:

Address=CO+PO*(pixel−1)+LO*(line−1)

where CO is a channel offset, PO is a pixel offset, LO is a line offset, pixel is a current pixel count and line is a current line count.

19. A color image data transformation system, comprising:
a memory storing the data in a format and an orientation of a first type; and
a transformation control device, coupled to said memory, transferring the data between said memory and a printer and changing the format and the orientation of the data between the first type and a second type and comprising a computer which calculates one of a storage and fetch address with said address being modified by a line pad offset and a channel pad offset.

20. A color image data transformation system, comprising:
a memory storing the data in a format and an orientation of a first type; and
a transformation control device, coupled to said memory, transferring the data between said memory and a printer and changing the format and the orientation of the data between the first type and a second type with the format comprising one of color pixel sequential, color line sequential and color channel sequential and the orientation comprising one of LRTB, LRBT, RLTB, RLBT, TBLR, TBRL, BTLR and BTRL where L is left, R is right, T is tope and B is bottom and the orientations are increments of 90 degrees.

* * * * *